Feb. 15, 1938. H. MIEDEL 2,108,722
LAMINATED CORROSION RESISTANT STRUCTURE
Filed March 1, 1935
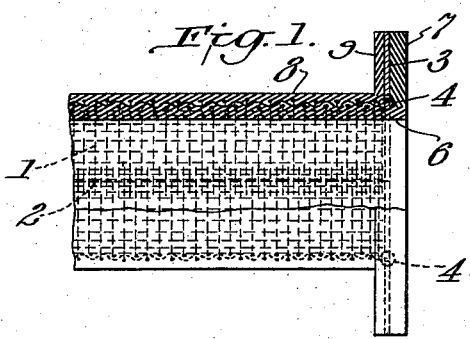
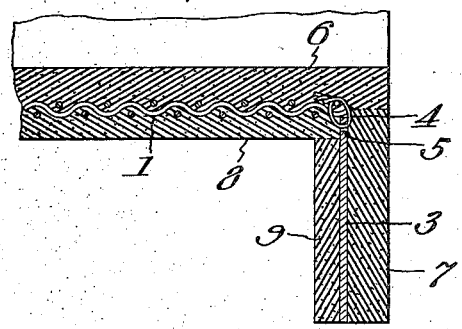
Inventor:
Hermann Miedel,
By Potter, Pierce & Scheffler,
Attorneys.

Patented Feb. 15, 1938

2,108,722

UNITED STATES PATENT OFFICE 2,108,722

LAMINATED CORROSION RESISTANT STRUCTURE

Hermann Miedel, Frankfort-on-the-Main, Germany, assignor to American Lurgi Corporation, New York, N. Y., a corporation of New York Application March 1, 1935, Serial No. 8,947
In Germany March 3, 1934

3 Claims. (Cl. 154—43)

This invention relates to a laminated corrosion resistant structure adapted for use in forming the walls of vessels, pipes and the like, which are to contain or convey corrosive liquids such as acids.

A great variety of structures have already been proposed for the production of apparatus of this kind, which must necessarily offer strong resistance to the action of chemicals. Thus, apparatus have been constructed of hard rubber, or chiefly of metal and provided with a covering of hard rubber or of an artificial resin. Iron vessels and pipes have also been employed which were protected by a coherent coating of enamel or by a lining of bitumen, and also vessels faced with acid-proof ceramic plates, the joints of which were filled in with acid-proof cements. Apparatus, such as vessels, pipes and the like, wholly constructed of acid-proof ceramic material, such as acid-proof stone ware, have also found industrial application.

For many purposes, apparatus of the foregoing kinds have considerable drawbacks. Their production is, to some extent, troublesome and costly, or they are too fragile or too heavy.

It is the object of the present invention to provide a structure for apparatus free from these defects, and a method of manufacturing such apparatus.

The structure of the present invention is constructed of a material that is highly resistant to shock provided at the places exposed to chemical corrosion or mechanical wear with a coating of hard or soft rubber, and reinforced with stays or braces for ensuring retention of shape.

The shock-proof material, which for convenience is referred to hereinafter as rubber concrete, preferably consists of mixtures of rubber with a solid hydraulic cementitious material such as cement and burned gypsum and with inert fillers such as quartz or kaolin, or fibrous substances such as asbestos, and shredded leather. In addition, the mixtures may contain the usual agents for vulcanizing rubber. The production of the apparatus of the present invention becomes a particularly simple matter when, for example, use is made of pasty mixtures of aqueous dispersions of rubber, such as rubber latex concentrates. Such mixtures are particularly recommendable by reason of their high plasticity.

The construction of apparatus using a structure according to the present invention will now be described by way of example, with reference to the production of a flanged pipe, as illustrated in the accompanying drawing.

In the drawing:

Fig. 1 is a fragmentary elevation, partly in longitudinal section, illustrating the apparatus of the invention; and Fig. 2 is a greatly enlarged fragmentary sectional view of the same.

In the first place, a skeleton for the body of the pipe is made of wire netting 1, the seam being closed by simply lacing it with wire 2. Sheet-metal rings 3 of suitable size acting as supports for the flanges are attached to the ends of the wire skeleton. These rings also, may be secured with wire 4 to the cylindrical portion of the skeleton, holes 5 for the passage of the wire being made for that purpose.

A flexible tube 6 of unvulcanized hard-rubber mixture produced in known manner, is drawn into the pipe skeleton and is caused to adhere to the latter by inflating an inserted pneumatic tube, or by the pressure of the hand or of a suitable tool. To increase the adhesion of the hard rubber to the wire netting, the former may first be coated with rubber solution, or some other cementing agent suitable for this purpose.

To form the flanges, suitably shaped pieces 7 of the hard-rubber composition can be applied by simple pressure, to the rings supporting the flanges, on the surface that is remote from the pipe. The pipe prepared in this manner is vulcanized to hard rubber in known manner.

After vulcanizing, the outside of the pipe and the still exposed side of the flange rings are covered, as at 8 and 9, respectively to the desired thickness—for example, by knifing, spraying or the like—with a mixture preferably composed of concentrated rubber latex and a hydraulic cementitious material, such as Portland cement, or burned gypsum, and containing, if desired, fillers such as quartz meal, kaolin, and/or vulcanizing agents. The mixtures are allowed to become hard and thoroughly dry, whereupon—after the surface has been smoothed, if necessary, and the rubber mixture has been vulcanized, if desired—the pipe is ready for use.

The several measures above described may also be performed in a different serial order, or with modifications obvious to those skilled in the art. For example, the flexible rubber tube—or the sheet rubber from which it is made—can be laid round a mandrel, which may be dismountable to facilitate subsequent removal, the wire netting being then secured on said tube, followed by the application of the plastic composition, the core being removed when the work has been finished.

If the vulcanization is to be performed under internal pressure, the supporting skeleton—which may, if desired, be adapted to be opened out or taken apart—can be provided internally, before the rubber mixture is applied, with a flexible layer—of millboard for example—which prevents penetration into the openings in the skeleton and can, for example, be taken out again after the vulcanization. If, after removing the millboard, the rubber body be first coated with a layer—approximately corresponding to the thickness of the former layer of millboard of, for instance, a mixture of rubber latex and hydraulic cement, the supporting netting being then applied again and, finally covered with another layer of said material, structures will then be obtained in which the supporting layer is situated in the vicinity of the boundary surface between the rubber layer and the rubber concrete, and embedded in the latter. The supports may, however, also be situated nearer to the outside and, if desired, even on the exterior of the layer of rubber concrete. Moreover, several supporting fabrics may be introduced, if desired, and the rubber layer may also be provided with supporting means.

The stiffening effect of the wire fabric can be heightened by means of other re-inforcing members, such as metal rods or rings. The wire fabric may also be replaced by other reinforcing means. The flanges can, for example, also be stiffened by means of wire fabric in place of iron plates.

The hard- or soft rubber mixture resisting chemical corrosion or mechanical wear, can also be applied in the form of a mixture of an aqueous dispersion of rubber, such as a rubber-latex mixture. This is always advisable in cases where the articles to be produced are of complicated design.

If desired, intermediate layers—for example of bituminous substances, in the case of apparatus intended solely for use at low temperatures—may be provided between the layer of rubber and the rubber concrete. Both the parts of the apparatus that consist of the rubber concrete and those composed of rubber, may be built up of several layers of different composition. Thus, for example, the rubber layer may be made up of several layers—for example of diminishing sulphur content towards the outside—and the rubber content of the rubber concrete may be varied within the layer.

As already mentioned, the vulcanizing may be performed before the rubber concrete is applied, or after the entire assemblage is completed. The composition of the rubber mixtures employed and the duration of the vulcanizing treatment must be determined, in known manner, in accordance with the desired physical properties of the products.

The interconnection between the rubber and the rubber concrete can be improved by means of adhesives, in known manner.

The composition of the rubber layer is adapted to resist the chemicals to which it will be subjected. If it is intended that it should consist of hard rubber, a moderately sulphured mixture is employed with advantage, which will furnish a slightly flexible product, like leather, and non-brittle. When raw rubber is employed, one of the two following mixtures, for example, may be taken:

|  | Parts |
|---|---|
| (1) Crepe rubber | 100 |
| Sulphur | 25 |
| Barium sulphate | 150 |
| Mineral oil | 5 |
| Vulkazit CT accelerator | 2 |
|  |  |
| (2) Crepe rubber | 100 |
| Sulphur | 35 |
| Kaolin | 75 |
| Vulkazit 576 accelerator | 1.5 |

If it be desired to start with a mixture of rubber latex, the following may be taken, for example:

|  | Parts |
|---|---|
| Rubber, in the form of a 75% latex concentrate | 100 |
| Sulphur | 30 |
| Vulkazit DM (accelerator) | 2 |

In cases where the rubber layer is exposed to powerful mechanical stressing, a soft-rubber mixture is preferably employed.

A suitable composition for the rubber concrete is produced for example by preparing beforehand a mixture of:

|  | Parts |
|---|---|
| Rubber-latex concentrate (75% strength) | 133 |
| Sulphur | 3 |
| Zinc oxide | 5 |
| Casein solution (12%) | 4.5 |
| Vulkazit F extra (accelerator) | 1 |
| Active charcoal | 5 |
| Quartz meal | 100–250 | this being mixed with 12 parts of hydraulic cement only just before use.

The process as above described with reference to pipes can be applied in a suitable manner in the case of apparatus and vessels of any kind, such as pans, troughs and storage vessels. It assures the advantage that, in most cases, the vulcanization can be performed under internal pressure.

The advantages of the apparatus prepared in the manner hereindescribed, which are proof against acids, alkalis and so forth, are manifold by comparison with those hitherto known.

In contrast to massive iron apparatus lined with acid-proof material, those according to the invention have the advantage of being more simply and cheaply manufactured. The difficulties encountered in the production of durable and perfect hard-rubber linings, particularly for example, in places that are difficult of access, such as in the interior of long pipes, owing to the occurrence of stubborn air inclusions between metal and rubber, disappear entirely. Similarly, the defect of brittleness—and consequent risk of fracture—in the case of all articles made of ceramic material, whether the same be coated with enamel, lined with plates, or composed of heavy stoneware, is obviated in the case of the products of the present invention. Moreover, the extremely high resistance offered to mechanical wear when soft-rubber compositions are employed, is of great value.

Particular advantage is afforded by the low weight, which is considerably under that of apparatus made of iron, stoneware or the other materials heretofore employed. The low weight enables pipes to be laid and vessels set up in buildings of lighter construction.

By comparison with pipes made entirely of hard rubber, those produced in accordance with the invention and having equal mechanical strength, offer the advantage of greater cheapness, since a thin layer of the chemically resistant hard rubber suffices, and moreover, substantialy cheaper material is employed. In addition, the pipes composed entirely of hard rubber are substantialy more fragile.

The absence of brittleness is shown, with particular advantage, in the case of transport vessels produced in accordance with the present invention, since their power of resisting shock is far greater than those made, for example, of stoneware. Moreover, owing to the elasticity and resilience of the rubber concrete, the apparatus produced in accordance with the invention do not require, for example, any further binding at the points of suspension and so forth.

The apparatus according to the invention offer a high resistance to the action of most chemical agents, not only at the surfaces formed of rubber, but also at those composed of the rubber concrete. For example, by suitably composing the rubber-cement mixture, the surfaces formed of said mixture can be rendered sufficiently proof against weak acids and the like, so that the corresponding parts also are able to withstand the gases of acid reaction, or acid drippings, that occur in chemical works.

The durability can also be further improved by means of a thin protective coating of paint, if desired. In such event, slight damage to the protective layer is not attended with such serious results as in the case of painted iron apparatus, in which even slight damage to the paint leads to rusting underneath, and thus to rapid corrosion.

The apparatus made according to the present invention offer such a high resistance to mechanical, as well as chemical, action that they may be termed practically impact- and shock-proof and unbreakable.

I claim:—

1. A self-supporting constructional material for use as the walls of a conduit, vessel or the like, for corrosive fluids, formed of a shock-resistant layer consisting essentially of a filler and the solid reaction products of rubber latex with a hydraulic cementitious material and containing at least 25% of rubber derived from the latex and at least 12% of the hydraulic cementitious material based upon the rubber content of the layer, and a layer of solid vulcanized rubber composition adhesively attached to said shock-resistant layer, said rubber layer constituting the surface of said material adapted to be contacted with the corrosive fluid.

2. A self-supporting constructional material as defined in claim 1 comprising a reinforcing layer embedded in said shock-resistant layer.

3. A self-supporting constructional material as defined in claim 1 in which said shock-resistant layer comprises about 100 parts of rubber derived from the latex, about 100-250 parts of inert filler, and about 12 parts of the hydraulic cementitious material.

HERMANN MIEDEL.